United States Patent
Stoica et al.

(10) Patent No.: US 9,990,230 B1
(45) Date of Patent: Jun. 5, 2018

(54) SCHEDULING A NOTEBOOK EXECUTION

(71) Applicant: Databricks Inc., San Francisco, CA (US)

(72) Inventors: Ion Stoica, Piedmont, CA (US); Yandong Mao, Albany, CA (US); Eric Liang, Berkeley, CA (US)

(73) Assignee: Databricks Inc., San Francisco, CA (US)

( * ) Notice: Subject to any disclaimer, the term of this patent is extended or adjusted under 35 U.S.C. 154(b) by 60 days.

(21) Appl. No.: 15/052,204

(22) Filed: Feb. 24, 2016

(51) Int. Cl.
*G06F 9/46* (2006.01)
*G06F 9/48* (2006.01)

(52) U.S. Cl.
CPC .................. *G06F 9/4887* (2013.01)

(58) Field of Classification Search
None
See application file for complete search history.

(56) References Cited

U.S. PATENT DOCUMENTS

| | | | |
|---|---|---|---|
| 2005/0283641 A1* | 12/2005 | Clark | G06F 11/2028 714/4.11 |
| 2006/0117208 A1* | 6/2006 | Davidson | H04L 67/1008 714/4.2 |
| 2007/0294697 A1* | 12/2007 | Theimer | G06F 9/5027 718/102 |
| 2009/0113034 A1* | 4/2009 | Krishnappa | G06F 15/16 709/223 |
| 2010/0333092 A1* | 12/2010 | Stefansson | G06F 9/44505 718/100 |
| 2016/0139964 A1* | 5/2016 | Chen | G06F 1/3206 718/104 |

\* cited by examiner

*Primary Examiner* — Dong Kim
(74) *Attorney, Agent, or Firm* — Van Pelt, Yi & James LLP

(57) ABSTRACT

A system for scheduling a notebook execution includes an interface and a processor. The interface is to receive an indication to schedule a notebook for execution, wherein the indication comprises a scheduled time and a cluster. The processor is to determine whether it is the scheduled time; and in the event that it is the scheduled time: determine whether the cluster is running; and in the event that the cluster is not running, set up the cluster and cause the notebook to execute using the cluster.

19 Claims, 6 Drawing Sheets

Schedule Job

Notebook Name: ☐

Notebook Version: ☐

Notebook Input Parameters: ☐

Cluster Name: ☐

Cluster Configuration Information: ☐

○ One-Time Job
  Job Time: ☐

◉ Recurring Job
  ◉ Daily
  ○ Weekly
  ○ Monthly
  Job Time: ☐

Notebook Authentication Information: ☐

Output Storage Location: ☐

Notification Method: ☐

SCHEDULING A NOTEBOOK EXECUTION

BACKGROUND OF THE INVENTION

A cluster system comprises a master system controlling a set of worker systems. A client system issues a job to the master system, which breaks it into tasks that can be executed in parallel by the worker systems. The client system stores code for execution on the cluster system, as well as output results associated with the code. Typically, the worker systems execute a code base that is stored using an interactive code window. However, sometimes it is limiting to have to execute the code using the interactive code window.

BRIEF DESCRIPTION OF THE DRAWINGS

Various embodiments of the invention are disclosed in the following detailed description and the accompanying drawings.

FIG. 3 is a diagram illustrating an embodiment of a user interface for scheduling a job.

DETAILED DESCRIPTION

Figure 1:
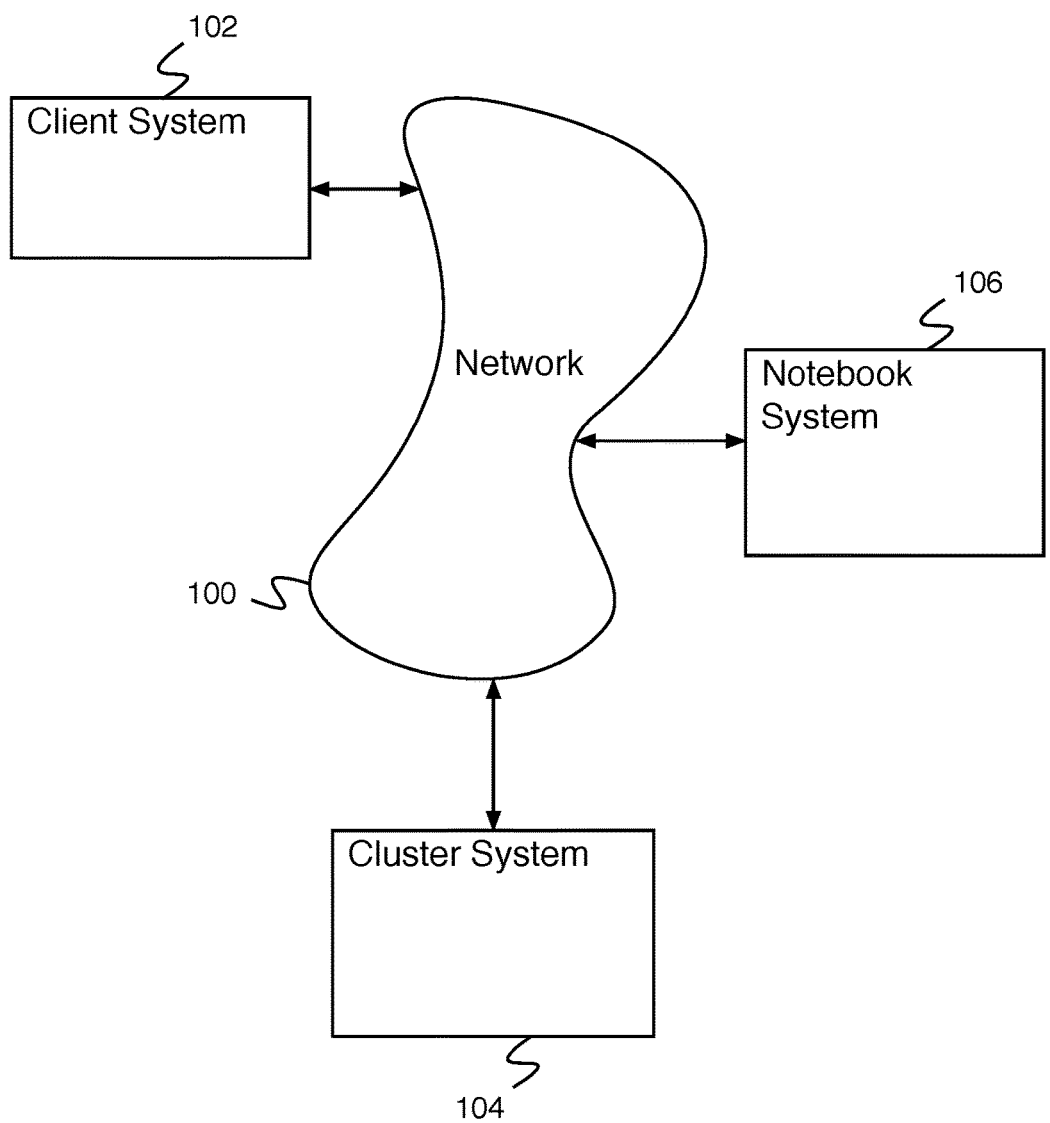
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for scheduling a notebook execution comprises an interface to receive an indication to schedule a notebook for execution, wherein the indication comprises a scheduled time and a cluster, and a processor to determine whether it is the scheduled time, and in the event that it is the scheduled time, determine whether the cluster is running, in the event that the cluster is not running, set up the cluster, and cause the notebook to execute using the cluster. In some embodiments, the system for scheduling a notebook execution additionally comprises a memory coupled to the processor and configured to provide the processor with instructions.

In some embodiments, a system for scheduling a notebook execution comprises a system for scheduling a notebook execution on a cluster system. In some embodiments, a notebook comprises a sequential interactive code file comprising one or more code sections. In some embodiments, one or more of the code sections produces an output. In some embodiments, a notebook comprises code for interactively querying and viewing data. The system for processing a notebook comprises a notebook system, comprising a notebook job scheduler, memory, and communications systems. In some embodiments, the notebook job scheduler comprises a notebook job scheduler for scheduling the execution of a notebook job for a later time. In some embodiments, the later time comprises a specific later time (e.g., 3 PM today, 6 AM Wednesday morning, etc.). In some embodiments, the later time comprises a recurring later time (e.g., every morning at 3 AM, every Saturday at 6 PM, etc.). In some embodiments, the execution of a notebook job is performed by a cluster system. Executing the notebook job comprises determining whether the cluster is running, in the event the cluster is not running, bringing up the cluster, and providing the notebook to the cluster for execution. In some embodiments, the notebook job scheduler additionally provides to the cluster a notebook version, notebook parameters, authentication information, or any other appropriate information.

FIG. 1 is a block diagram illustrating an embodiment of a network system. In some embodiments, the network system of FIG. 1 comprises a system for processing a notebook. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, cluster system 104, and notebook system 106 communicate via network 100. In some embodiments, client system 102 comprises a computing system client. In various embodiments, client system 102 comprises a client system for requesting computing jobs, for managing a computing cluster, for data analysis programming, for creating a notebook, for viewing output data from a notebook, or for any other appropriate purpose. In some embodiments, a computing system user interacts directly with client system 102. Cluster system 104 comprises a cluster computing system. In various embodiments, cluster system 104 comprises a cluster computing system for performing computing jobs, for analyzing data, for producing output data, for processing a notebook, or for any other appropriate purpose. In some embodiments, cluster system 104 comprises and/or accesses a big data repository. In some embodiments, network 100 accesses a big data repository independently from cluster system 104. Notebook system 106 comprises a system for processing data. In some embodiments, notebook system 106 comprises a system for processing a notebook. In various embodiments, notebook system 106 comprises a system for receiving a notebook, for receiving an indication to execute a notebook, for receiving an indication to schedule a notebook for execution at a later time, for receiving an indication to schedule a notebook for recurring execution, for providing commands to cluster system 104 for execution, for providing a notebook to cluster system 104 for execution, for determining an output from the execution of a notebook, for receiving an output from the execution of a notebook, for storing an output from an execution of a notebook, for providing output data to client system 102, or for any other appropriate purpose. In some embodiments, notebook system 106 accesses data from a big data repository for executing a notebook. In some embodiments, client system 102 comprises a processor and a memory. In various embodiments, client system 102 comprises a single-processor computer, a multiple-processor computer, a plurality of computers, a mobile computer, a tablet computer, or any other appropriate computer. In some embodiments, cluster system 104 comprises a processor and a memory. In some embodiments, cluster system 104 comprises a cluster of computers (e.g., a plurality of interconnected computers for executing a large computing job at a set of small pieces). In various embodiments, each of the one or more computers of cluster system 104 comprises a single-processor computer, a multiple-processor computer, a plurality of computers, a mobile computer, a tablet computer, or any other appropriate computer. In some embodiments, notebook system 106 comprises a processor and a memory. In various embodiments, notebook system 106 comprises a single-processor computer, a multiple-processor computer, a plurality of computers, a mobile computer, a tablet computer, or any other appropriate computer. In some embodiments, notebook system 106 comprises a client system (e.g., a computing system user interacts directly with notebook system 106).

Figure 2:
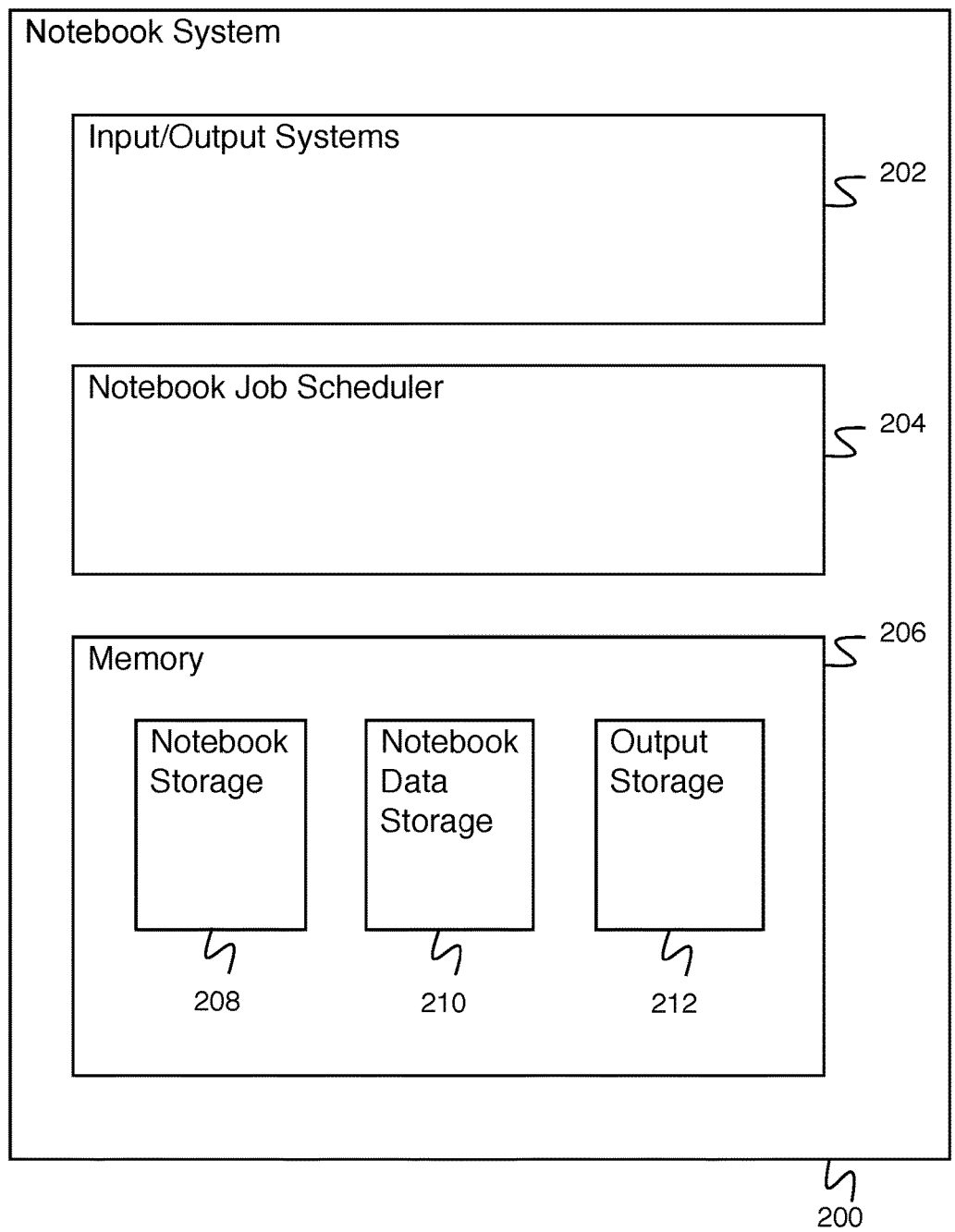
FIG. 2 is a block diagram illustrating an embodiment of a notebook system.

FIG. 2 is a block diagram illustrating an embodiment of a notebook system. In some embodiments, notebook system 200 of FIG. 2 comprises notebook system 106 of FIG. 1. In the example shown, notebook system 200 comprises input/output systems 202, notebook job scheduler 204, and memory 206. In various embodiments, input/output systems 202 comprise input/output systems for communicating with a network, with a user, with a client system, with a cluster system, with a big data repository, or with any other appropriate entity or system. In various embodiments, input/output systems 204 comprises input output systems for receiving a notebook, for communicating with a cluster system for executing a notebook, for providing notebook results, or for any other appropriate communication task. Notebook job scheduler 204 comprises a job scheduler for scheduling execution of a notebook. In some embodiments, notebook job scheduler 204 receives an indication to schedule a notebook for execution. In various embodiments, the indication comprises a scheduled time (e.g., a specific scheduled time or a recurring scheduled time), a cluster, a notebook name, a notebook version, input parameters, cluster configuration information, authentication information, an output storage location, a notification method, or any other appropriate information. In various embodiments, notebook job scheduler 204 executes notebook commands, provides notebook commands to a cluster system for execution, determines notebook results, receives notebook results, provides notebook results to a client system, or performs any other appropriate notebook processing function. Memory 206 comprises a memory for storing data. In the example shown, memory 206 comprises notebook storage 208 for storing notebook files. Memory 206 additionally comprises notebook data storage 210 for storing notebook data (e.g., notebook version information, notebook input parameters, notebook authentication information, or any other appropriate notebook data). Memory 206 additionally comprises output storage 212 for storing notebook output data.

FIG. 3 is a diagram illustrating an embodiment of a user interface for scheduling a job. In some embodiments, schedule job user interface 300 is provided by a notebook system (e.g., notebook system 106 of FIG. 1) to a user system (e.g., user system 102 of FIG. 1) for scheduling a job. In some embodiments, schedule job user interface 300 is instantiated via a schedule job user interface button. In some embodiments, a schedule job user interface button is accessed via a notebook view. In the example shown, schedule job user interface 300 comprises input fields for a notebook name, a notebook version, and one or more notebook input parameters (e.g., for specifying run options for the notebook, inputs to the notebook, etc.). In some embodiments, the notebook name, version, and input parameters define the job to be run. Schedule job user interface 300 additionally comprises a cluster name and cluster configuration information. In some embodiments, a cluster name indicates a set of computers forming a computer cluster. In some embodiments, a cluster name indicates a configuration of a virtual computer cluster (e.g., a cloud computing cluster). In various embodiments, cluster configuration information comprises a number of computers, a computer type, an operating system type, hardware specifications, or any other appropriate cluster configuration information. Schedule job user interface 300 additionally comprises an input for indication of a one-time job (e.g., a job to be executed once) and the job time for the one-time job, or a recurring job (e.g., a job to be executed repeatedly on a recurring schedule) and the schedule (e.g., repeat frequency and job time) for the recurring job. In various embodiments, the recurring job is specified using a period (e.g., every 2 days, every 26 hours, every 3 weeks, etc.) and a start date and/or time, or any other appropriate reoccurrence frequency and/or starting specification. In the example shown, schedule job user interface 300 additionally comprises a notebook authentication information input field for entering notebook authentication information. In various embodiments, notebook authentication information comprises a password, a token, a credential, or any other appropriate notebook authentication. In some embodiments, entering notebook authentication information is necessary for the job to execute with the same authority as the requesting user. In the example shown, schedule job user interface 300 additionally comprises an output storage location input field. In some embodiments, an output storage location comprises a desired output storage location for the job output data to be stored. In various embodiments, the output storage location comprises an output storage location on the notebook system, an output storage location on the user system, an output storage location on another local server, an output storage location in the cloud, or any other appropriate output storage location. In the example shown, schedule job user interface 300 additionally comprises a notification method field. In some embodiments, the notification method comprises the notification method for notifying the user scheduling the job of the job results (e.g., job success, job failure, job output parameters, etc.).

Figure 4:
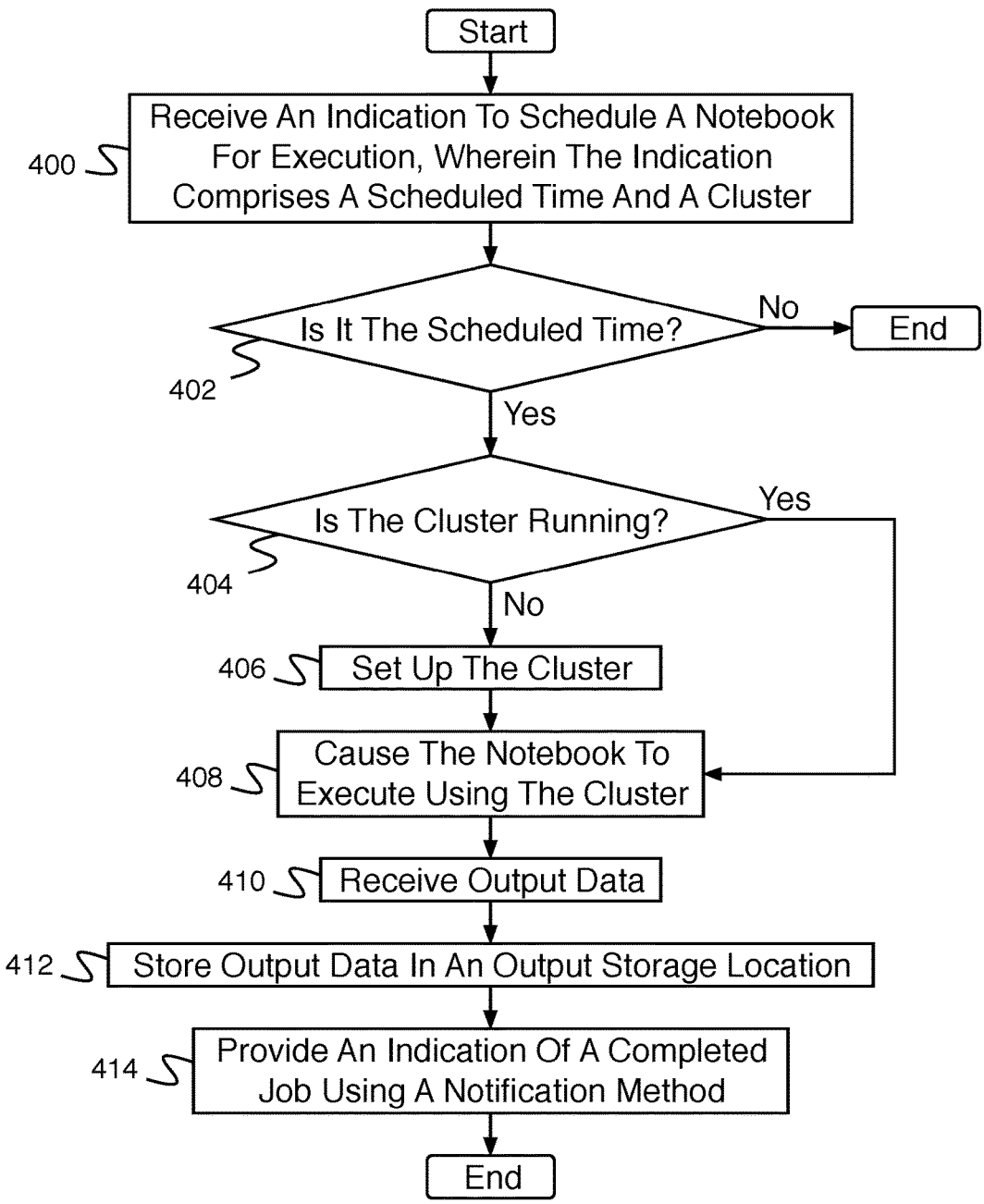
FIG. 4 is a flow diagram illustrating an embodiment of a process for scheduling a notebook execution.

FIG. 4 is a flow diagram illustrating an embodiment of a process for scheduling a notebook execution. In some embodiments, the process of FIG. 4 is executed by notebook job scheduler 204 of FIG. 2. In the example shown, in 400, an indication to schedule a notebook for execution is received, wherein the indication comprises a scheduled time and a cluster. In some embodiments, the indication is received via a schedule job user interface (e.g., schedule job user interface 300 of FIG. 3). In 402, it is determined whether it is the scheduled time. In the event it is determined that it is the scheduled time, control passes to 404. In the event it is determined that it is not the scheduled time, the process ends. In some embodiments, in the event it is determined that it is not the scheduled time, the process waits until it is the scheduled time and then control passes to 404. In 404, it is determined whether the cluster is running. In the event it is determined that the cluster is running, control passes to 408. In some embodiments, in the event that the cluster is not running, after a wait time, it is determined whether the cluster is running again. In the event it is determined that the cluster is not running, control passes to 406. In some embodiments, a new cluster instantiation is set up for every execution of a job. In 406, the cluster is set up. For example the cluster is instantiated. In some embodiments, it is determined whether a cluster has come up and is ready to execute a process and in the event that the cluster is not ready, then a delay time is let to pass and it is determined again whether the cluster is up and running. In 408, the notebook is caused to execute using the cluster. In 410, output data is received. In 412, output data is stored in an output storage location. In 414, an indication of a completed job is provided using a notification method. In various embodiments, a notification method comprises email, short message service (e.g., SMS) message, a notification within cluster system software, a text-based message sent via the Internet (e.g., using a text-based message system—for example, Twitter, WhatsApp, Slack, etc.), or any other appropriate notification method.

Figure 5:
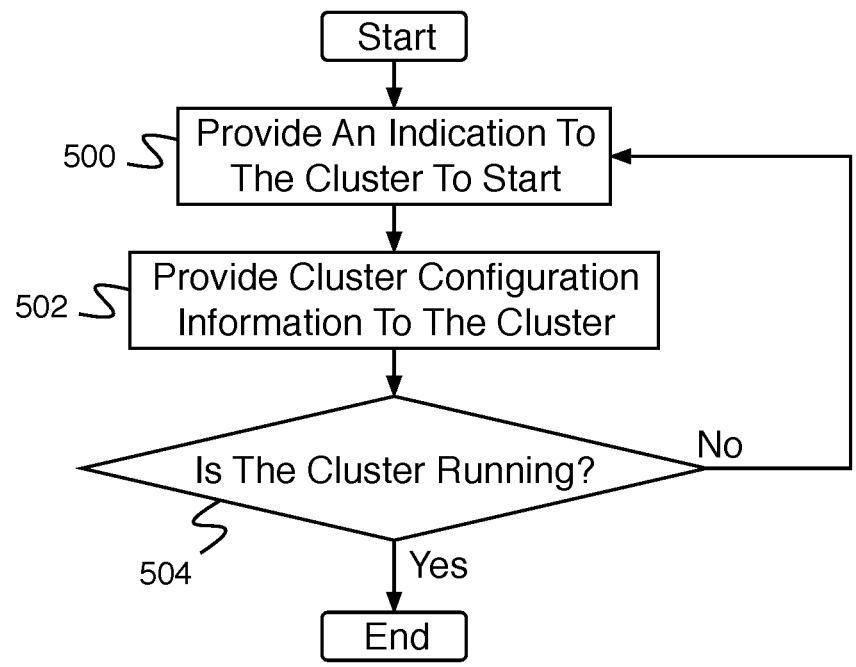
FIG. 5 is a flow diagram illustrating an embodiment of a process for setting up a cluster.

FIG. 5 is a flow diagram illustrating an embodiment of a process for setting up a cluster. In some embodiments, the process of FIG. 5 implements 406 of FIG. 4. In the example shown, in 500, an indication is provided to the cluster to start. In various embodiments, the indication comprises an indication to a master computer of the cluster, an indication to each computer of the cluster, an indication to a cluster management system, or an indication to any other appropriate cluster system. In 502, cluster configuration information is provided to the cluster. In various embodiments, cluster configuration information comprises a number of computers, a computer type, an operating system type, hardware specifications, or any other appropriate cluster configuration information. In 504, it is determined whether the cluster is running. In some embodiments, the process waits an appropriate period of time before making a determination of whether the cluster is running. In the example shown, in the event it is determined that the cluster is not running, control passes to 500. In some embodiments, in the event it is determined that the cluster is not running, an error message is provided to the user that scheduled the job (e.g., using a notification method). In some embodiments, in the event that more than a threshold number of attempts to start the cluster have been made (e.g., more than a threshold number of indications to start the cluster have been provided), the process ends. In the example shown, in the event it is determined in 504 that the cluster is running, the process ends.

Figure 6:
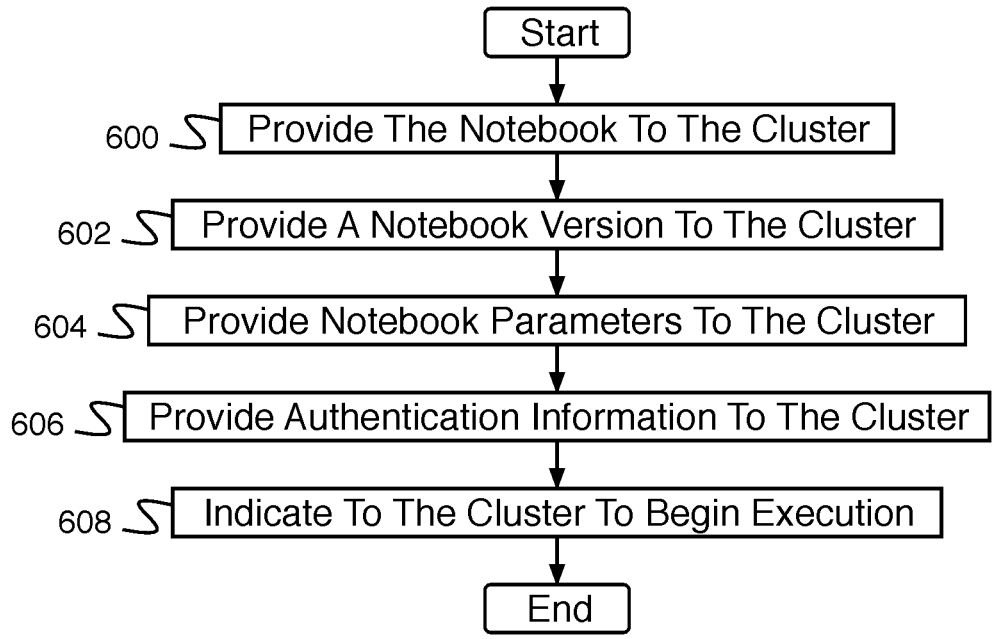
FIG. 6 is a flow diagram illustrating an embodiment of a process for causing a notebook to execute using a cluster.

FIG. 6 is a flow diagram illustrating an embodiment of a process for causing a notebook to execute using a cluster. In some embodiments, the process of FIG. 6 implements 408 of FIG. 4. In the example shown, in 600, the notebook is provided to the cluster. In 602, a notebook version is provided to the cluster. In some embodiments, a notebook version instructs the cluster which of a set of versions stored by the notebook to execute. In some embodiments, the notebook only stores a single version. In 604, notebook parameters are provided to the cluster. In various embodiments, notebook parameters comprise instructions for notebook execution, input data for the notebook, or any other appropriate notebook parameters. In 606, authentication information is provided to the cluster. In some embodiments, authentication information comprises authentication information corresponding to the user that scheduled execution of the notebook and allows the cluster to execute the job with the authority of the user. In 608, the cluster is indicated to begin execution. In some embodiments, commands of the notebook are processed one at a time and provided one at a time to the cluster (e.g., in the event they require the cluster for execution).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for scheduling a notebook execution, comprising:
   an interface to receive an indication to schedule a plurality of notebooks for execution, wherein each of the plurality of notebooks includes a sequential interactive code file with at least one code section and at least one version, and the indication comprises: a scheduled time, a cluster, and a version of the notebook to be executed; and
   a physical processor to:
      determine that it is the scheduled time; and
      in response to the determination that it is the scheduled time:
         determine that the cluster is not running;
         in response to the determination that the cluster is not running, set up a cluster instantiation for each of the plurality of notebooks to be executed including providing cluster configuration information to the instantiated cluster, the cluster configuration information including a type of operating system; and
         instruct the instantiated cluster to execute at least one of the plurality of notebooks.

2. The system of claim 1, wherein the indication comprises a notebook name.

3. The system of claim 1, wherein the indication comprises input parameters.

4. The system of claim 1, wherein the indication comprises cluster configuration information.

5. The system of claim 1, wherein the indication comprises authentication information.

6. The system of claim 1, wherein the indication comprises an output storage location.

7. The system of claim 1, wherein the indication comprises a notification method.

8. The system of claim 1, wherein the cluster comprises a group of subsystems.

9. The system of claim 1, wherein setting up the cluster instantiation comprises providing an indication to the cluster to start.

10. The system of claim 1, wherein instructing the instantiated cluster to execute at least one of the plurality of notebooks comprises providing notebook information to the cluster.

11. The system of claim 1, wherein instructing the instantiated cluster to execute at least one of the plurality of notebooks comprises providing authentication information to the cluster.

12. The system of claim 1, wherein instructing the instantiated cluster to execute at least one of the plurality of notebooks comprises providing an output storage location to the cluster.

13. The system of claim 1, wherein the physical processor is further to access output data stored in an output storage location.

14. The system of claim 1, wherein the scheduled time comprises a specific scheduled time.

15. The system of claim 1, wherein the scheduled time comprises a recurring scheduled time.

16. The system of claim 1, wherein the physical processor is further configured to, in response to a determination that the cluster is not running, determine whether the cluster is running after a pre-defined delay time.

17. The system of claim 1, wherein the set up of the cluster instantiation includes providing cluster configuration information to the cluster, the cluster configuration information including hardware specifications of computers in the cluster.

18. A method for scheduling a notebook execution, comprising:
receiving an indication to schedule a plurality of notebooks for execution, wherein each of the plurality of notebooks includes a sequential interactive code file with at least one code section and at least one version, and the indication comprises: a scheduled time, a cluster, and a version of the notebook to be executed;
determining, using a physical processor, that it is the scheduled time; and
in response to the determination that it is the scheduled time:
determining that the cluster is not running;
in response to the determination that the cluster is not running, setting up a cluster instantiation for each of the plurality of notebooks to be executed including providing cluster configuration information to the instantiated cluster, the cluster configuration information including a type of operating system; and
instructing the instantiated cluster to execute at least one of the plurality of notebooks.

19. A computer program product for scheduling a notebook execution, the computer program product being embodied in a non-transitory computer readable storage medium and comprising computer instructions for:
receiving an indication to schedule a plurality of notebooks for execution, wherein each of the plurality of notebooks includes a sequential interactive code file with at least one code section and at least one version, and the indication comprises: a scheduled time, a cluster, and a version of the notebook to be executed;
determining that it is the scheduled time; and
in response to the determination that it is the scheduled time:
determining that the cluster is not running;
in response to the determination that the cluster is not running, setting up a cluster instantiation for each of the plurality of notebooks to be executed including providing cluster configuration information to the instantiated cluster, the cluster configuration information including a type of operating system; and
instructing the instantiated cluster to execute at least one of the plurality of notebooks.

* * * * *